March 1, 1960 F. G. KRAFFT 2,926,653
GRINDING MACHINES
Filed Sept. 18, 1958

INVENTOR.
FREDERICH G. KRAFFT
BY
*Marchal, Biebel, French & Bugg*
ATTORNEYS

United States Patent Office

2,926,653
Patented Mar. 1, 1960

2,926,653

GRINDING MACHINES

Frederich G. Krafft, Springfield, Ohio, assignor to The Thompson Grinder Company, Springfield, Ohio, a corporation of Ohio Application September 18, 1958, Serial No. 761,717

6 Claims. (Cl. 125—11)

This invention relates to grinding machines, and more particularly to apparatus for dressing grinding wheels to grind a desired profile on a workpiece.

The invention has specific relation to grinding wheel dressers of the type which incorporate a template or other cam having a guide surface thereon for defining the desired configuration of the grinding wheel, and in the operation of which a stylus or other follower is caused to follow the cam surface and thereby to guide the dressing tool along the surface of the wheel. For example, if the dresser is of the type employing a diamond tipped dressing tool, the tool and a cooperating stylus may be carried by the same movable part of the dresser which is movable either manually or by a suitable power drive in such manner that the stylus follows the outline of a template secured to the stationary part of the dresser and thereby causes the tool to reproduce the contour of this template on the surface of the wheel.

In the operation of a dresser as outlined above, it is required that the movement of the dressing tool be relatively slow, and the movement of the stylus along the template is similarly slow. At the same time, since the stylus should be maintained in close engagement with the template in order to assure accurate reproduction thereof, substantial friction may be involved in the movement of the stylus. It has therefore been found that there is a definite tendency for the stylus to stick-slip along the template instead of moving smoothly as desired to produce a surface of maximum accuracy on the grinding wheel, and while this tendency may be more pronounced in the case of manually operated dressers, it is also present to a considerable degree in dressers which are power driven.

It is a primary object of the present invention to provide a dresser of the general type outlined above which is so constructed and arranged that the tendencies to stick-slipping as noted above are fully overcome so that the stylus is caused to move smoothly and evenly along the guiding surface of the cooperating template.

These results are accomplished in accordance with the invention by causing the dresser to undergo rapid vibrations of small amplitude in such manner that relative dithering movement is caused to occur between this stylus and its grinding template. The entire dresser can be subjected to such dither, but it is adequate for the purposes of the invention if the dither be primarily localized in the movable part which carries the stylus and the dressing tool, as by mounting a suitable dither inducing mechanism on or adjacent the movable connection between the movable part and the base portion of the dresser.

Another object of the invention is to provide a grinding wheel dresser of the type outlined above which incorporates a vibratory solenoid or other suitable mechanism for inducing dither of the stylus with respect to its guiding template or other cam and thereby insuring smooth movement of the stylus along its guiding surface without affecting maintenance of proper continuous engagement between the stylus and this surface.

An additional object of the invention is to provide a grinding wheel dresser as outlined above wherein the dressing tool and its cooperating stylus are carried by the same part which is movable with respect to the base of the dresser, and wherein a vibratory solenoid or equivalent device is mounted in associated relation with this movable part causing the part to vibrate at such frequency and amplitude that the stylus moves smoothly along its guiding cam at all speeds of operation.

It is also among the objects of the invention to make possible the achievement of its advantages by conversion of existing grinding wheel dressers in accordance with the principles of the invention outlined above, and further to provide these advantages in both manually and power driven dressers.

Further objects and advantages of the invention will be apparent from the following description, the accompanying drawing and the appended claims.

Figure 1:
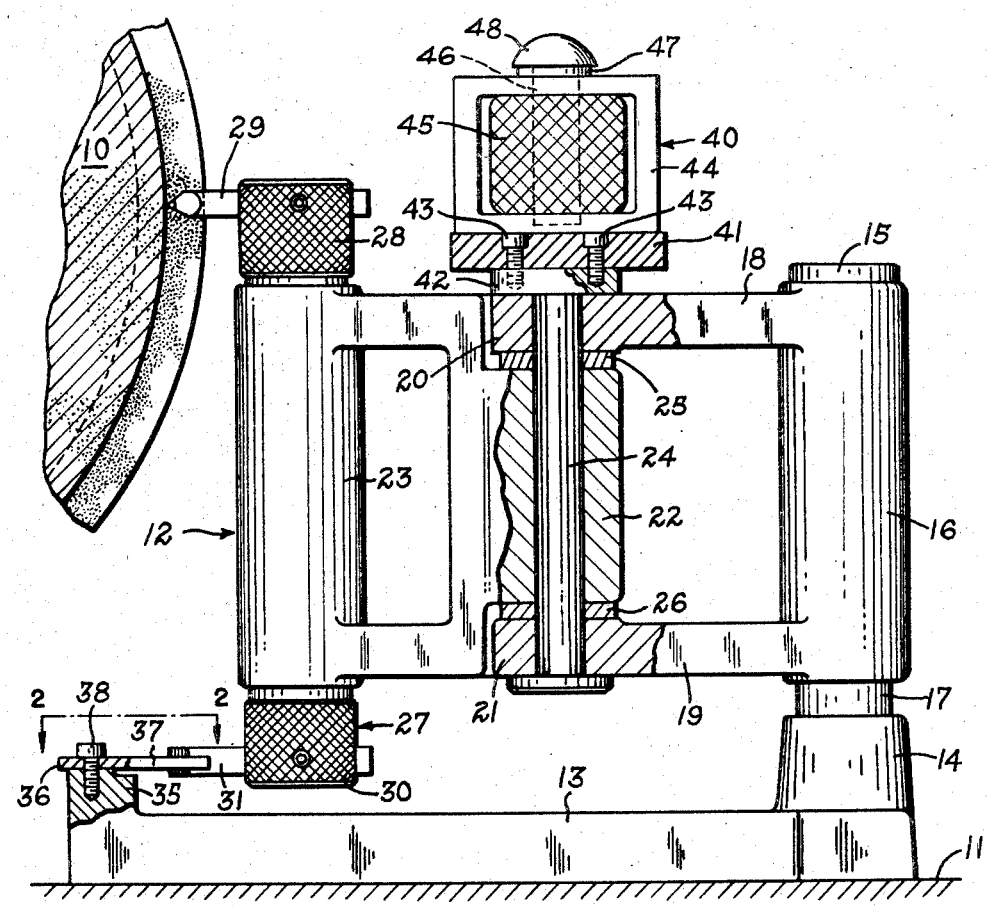
Fig. 1 is a view in side elevation, partly broken away in vertical section, showing the manually operated guiding wheel dresser constructed and operating in accordance with the invention.

Referring to the drawing, which illustrates preferred embodiments of the invention, Fig. 1 shows at 10 a fragment of a profile grinding wheel which represents the wheel in an existing surface grinding machine such as shown, for example, in Wilson Patent No. 2,576,201 issued November 27, 1951 to the assignee of this application. Such grinding machines conveniently include a horizontally reciprocating table on which is mounted a suitable mechanical, hydraulic or electromagnetic chuck or fixture for holding the workpiece, and a fragment of such chuck of the electromagnetic type is represented at 11. The dresser 12 in Fig. 1 is accordingly shown as incorporating a base 13 adapted to be secured to the bed by means of such fixture 11.

The dresser includes pivoted support arms which provide universal movement in a plane to a grinding wheel dressing tool. The base 13 includes a first upwardly extended boss portion 14 which supports a first pivot pin 15. A first arm 16 is rotatably received and carried on the pivot 15 with a thrust washer 17 interposed between the arm 16 and the boss portion 14 to permit free rotational movement of the arm 16 on the pivot 15.

The first arm 16 includes a pair of bifurcated portions 18 and 19 which are respectively terminated in pivot pin receiving eyes 20 and 21. The eyes 20 and 21 are spaced from each other to receive therebetween a bearing portion 22 of a second arm 23, and a second pivot pin 24 is received through the aligned openings formed by eyes 20, 21 in arm 16 and the bearing portion 22 of arm 23. One of a pair of washers 25 and 26 are placed on each side of the bearing portion 22 for free rotational movement of the arm 23 on the arm 16.

Wheel dressing tool and stylus holding means are associated with the second arm 23 to hold a grinding wheel dressing tool fixed with respect to a template follower and free to rotate together within the second arm 23. A third pivot pin 27 is rotatably received in the second arm 23 and includes a head portion 28 through which is releasably received a wheel dressing tool 29. The pivot pin 27 is extended below the arm 23 to include a foot portion 30 through which is releasably received a template following stylus 31.

Template means are provided over which the stylus 31 may be guided to true the desired form on the grinding wheel 10. The base 13 includes a second upwardly extending boss portion 35 which is provided with a relatively smooth platform surface 36 upon which a desired template 37 is received. A pair of machine screws 38 rigidly fix the template 37 to the base 13. The template 37 is provided with a grinding wheel contour 39 which defines the form to which the grinding wheel will be dressed by the tool 29. The stylus 31 is engageable with the contour 39 by the hand manipulation of the arm 23 and by the lateral movement of the stylus 31 by means of the rotation of the pivot 27.

Vibratory motion inducing means are provided to effect rapid and minute dither movement of the stylus 31 with respect to the template 37. This means includes an electrical solenoid vibrator 40 which maintains these relatively movable elements in a state of kinetic flux. A base 41 of the vibrator 40 is secured to the dresser 12 at the head 42 of the second pivot pin 24 by a pair of cap screws 43. By locating the vibrator 40 on the pivot pin 42, a substantially vertical movement may be effected at the stylus 31 with respect to the template 37. However, it is understood that any mounting means of a vibratory inducing means is suitable which is effective to cause the desired dither movement.

A solenoid frame 44 is mounted on the base 41 and receives an electrical energizing coil 45. A vibratory armature 46 is loosely received within coil 45 and is movably subjected to the flux developed by the coil 45 in the frame 44. A brass shim 47 is interposed on the armature 46 between the armature head 48 and the frame 44 to provide a small amount of free movement for vibratory motion of the armature 46. The coil 45 may be energized from any suitable A.-C. source such as 115 volts, 60 cycle.

Figure 2:
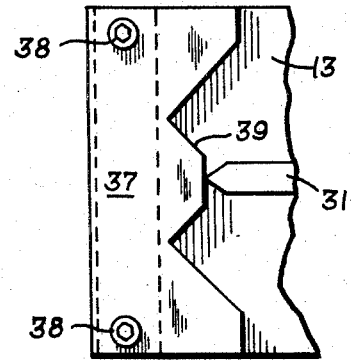
Fig. 2 is a fragmentary view taken as indicated by the line 2—2 of Fig. 1.
Figure 3:
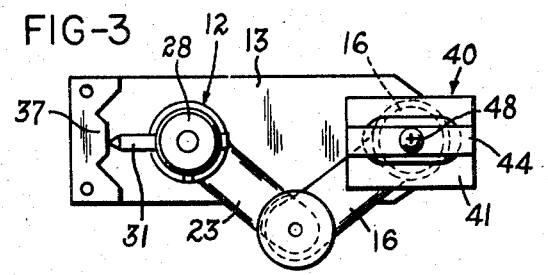
Fig. 3 is a plan view of a modified form of the invention.

As already noted, the location and mounting of the vibrator 40 may be varied as desired provided that conditions are retained which will assure the inducing of an effective relative dithering movement between the stylus 30 and template 37. For example, Fig. 3 shows a dresser which is of essentially the same construction as described in connection with Figs. 1 and 2 except that the vibrator 40 is mounted on the pivot pin 15. Such mounting may be preferred for some types of dressers, since it eliminates any effect of the weight of the vibrator on the movable parts of the device.

In the operation of the dresser, the stylus 31 is carefully hand guided over the contour 39 of the template 37, and this in turn causes the dressing tool 29 to reproduce the corresponding contour on the grinding surface of the wheel 10. The minute dither movement introduced by vibrator 40 maintains a slight, but constant, and substantially vertical movement of the stylus 31 with respect to the template 37. This movement eliminates any tendency for sticking and slipping as the stylus is traced over the template contour while avoiding distortion of the form being dressed into the wheel. Also, this dither movement reduces any tendency to stick in the relatively rotatable parts of the grinding wheel dresser.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a grinding wheel dresser including a base upon which is mounted a dressing tool with universal movement in a plane, the improvement comprising a grinding wheel surface template fixed with respect to said base, a template follower fixed with respect to said tool and engageable with said template to guide said tool over the grinding surface of a grinding wheel, and electrical dither inducing means operable directly from a primary source of A.-C. power connected to cause minute and rapid movement of said follower with respect to said template.

2. In a grinding wheel dresser for reforming the contour in the periphery of a grinding wheel, that improvement comprising a base, a dressing tool pivotally received on said base and manipulatable to engage said wheel, a template fixed with respect to said base and having formed thereon the desired grinding wheel contour, a template follower fixed for movement with said tool and guidable along said template contour, and a solenoid vibrator operable directly from a primary source of A.-C. power including an element fixed to said tool and operable to cause dither of said follower with respect to said template.

3. In a grinding wheel dresser, a base, a first arm pivotally received on said base for movement generally parallel thereto, a second arm pivoted on said first arm for generally parallel movement with said first arm, a wheel dressing tool pivotally mounted on said second arm, a template fixed to said base, a template follower fixed for pivotal movement with said tool and engageable with said template, and a solenoid vibrator having an operative connection with said arms effective to impart a vibratory motion to said follower substantially normal to the plane of movement of said arms.

4. In a grinding wheel dresser, a base, a first arm pivotally received on said base for movement generally parallel thereto, a second arm pivoted on said first arm for generally parallel movement with said first arm, a wheel dressing tool pivotally mounted on said second arm, a template fixed to said base, a template follower fixed for pivotal movement with said tool and engageable with said template, and electrical vibrator means operable directly from a primary source of A.-C. power and connected to impart a vibratory motion to said follower substantially normal to the plane of movement of said arms.

5. In a grinding wheel dresser, a base, a first arm pivotally received on said base for movement generally parallel thereto, a second arm pivoted on said first arm for generally parallel movement with said first arm, a wheel dressing tool pivotally mounted on said second arm, a template fixed to said base, a template follower fixed for pivotal movement with said tool and engageable with said template, and vibration inducing means having an operative connection with said arms and effective to impart minute rapid movement thereto to place said arms in a state of kinetic flux to obviate the effects of static friction.

6. In a grinding wheel dresser for reforming the contour in the periphery of a grinding wheel, that improvement comprising a base, a dressing tool arm movably received on said base and having a tool thereon manipulatable to engage said wheel, a template fixed with respect to said base and having formed thereon the desired grinding wheel contour, a template follower fixed for movement with said arm and guidable along said template contour, and an electric vibrator fixed to said arm and operable directly from a primary source of A.-C. power to cause dither of said follower with respect to said template.

References Cited in the file of this patent

UNITED STATES PATENTS

| 2,137,690 | Kropf | Nov. 22, 1938 |
| 2,305,115 | Sneed | Dec. 15, 1942 |
| 2,391,122 | Bunker | Dec. 18, 1945 |
| 2,602,438 | Oliver | July 8, 1952 |
| 2,746,813 | Massa | May 22, 1956 |